W. F. DAVIS.
Machines for Connecting the Links of Ornamental Chains.

No. 151,362. Patented May 26, 1874.

Witnesses:
James N. Ashley
Edwin Eagles

Inventor.
William F. Davis,
per Frank L. Pope
Atty

UNITED STATES PATENT OFFICE.

WILLIAM F. DAVIS, OF NORTH ATTLEBOROUGH, MASSACHUSETTS.

IMPROVEMENT IN MACHINES FOR CONNECTING THE LINKS OF ORNAMENTAL CHAINS.

Specification forming part of Letters Patent No. 151,362, dated May 26, 1874; application filed March 24, 1874.

*To all whom it may concern:*

Be it known that I, WILLIAM F. DAVIS, of North Attleborough, in the county of Bristol and State of Massachusetts, have invented a new and Improved Machine for Making Ornamental Chains from Beads or Links for Ladies' Bracelets, &c.; and I hereby declare that the following is a full, clear, and exact description of the same, reference being had to the accompanying drawing, which forms part of this specification.

This invention comprehends the combination of the following elements: A hopper which receives the beads or links to be made into chains; an inclined reciprocating feed board or plate, provided with a series of grooves or guideways, which communicate with the hopper and convey the beads or links therefrom; a gate which rises to permit a row of beads or links to pass under it, and afterward descends as the feed board or plate moves forward, and forces the links or beads into the trough of a table, which is moved to and fro laterally for adjusting the rows of beads or links alternately into position, the said table also having provision for threading a wire through the several rows, in order to produce a woven bracelet or chain of the character substantially as described in United States Letters Patent granted to me on the 16th day of September, 1873.

Figure 1:
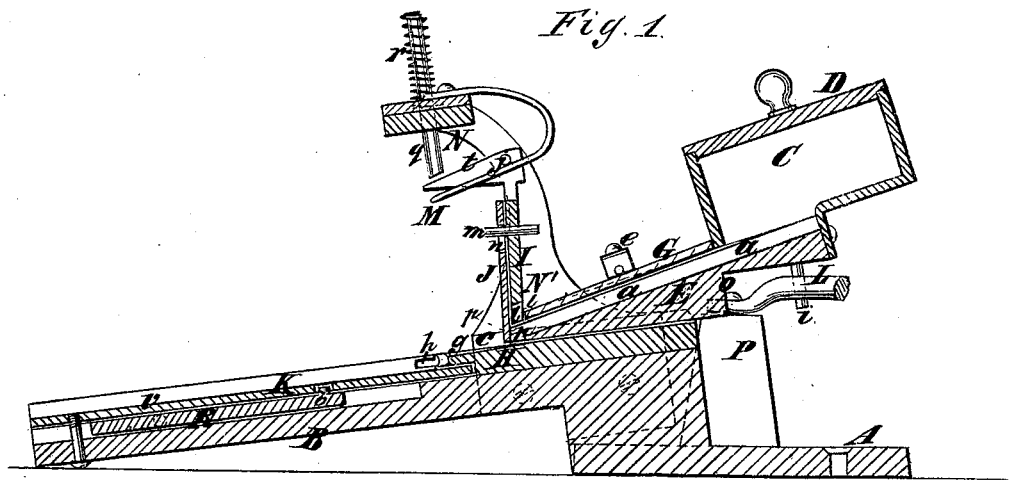
Figure 2:
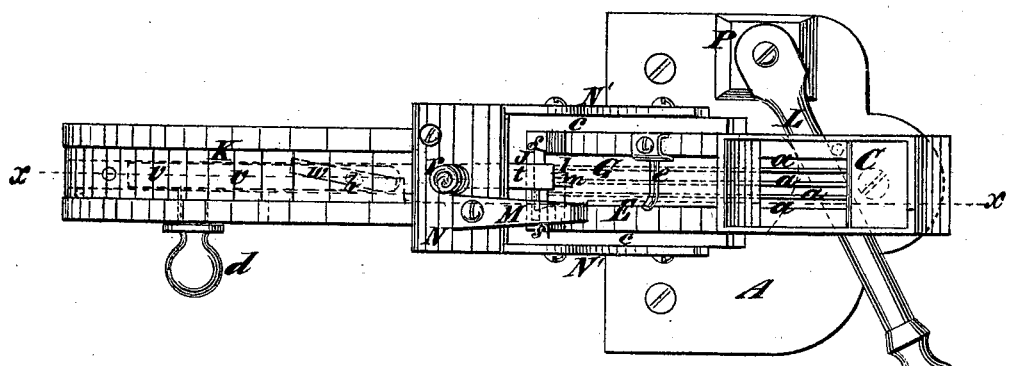
Figure 3:
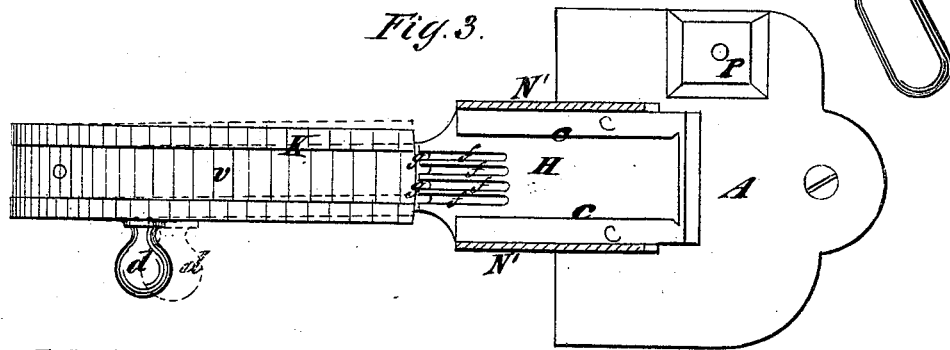

In the accompanying drawing, Figure 1 is a longitudinal section of my present invention, taken on the plane of the dotted line $xx$, Fig. 2. Fig. 2 is a plan or top view of the same. Fig. 3 is a plan or top view of the frame in which the feed-board slides, and also of the oscillating table.

A B designate the frame or base-plate of the machine. C is the hopper which receives the links. This hopper is provided with a cover, D, and is shown as being mounted on the upper end of the reciprocating feed-board or plate E. This feed board or plate is arranged to slide back and forth longitudinally in guideways $c$, provided on a platform, H, mounted on the part B of the base-plate; and the said feed-board is provided with a series of longitudinal grooves or channels, $a\ a$, which extend from the interior of the hopper, and terminate near the outer end of the said feed-board in passages or slots $p\ p$, which latter communicate with the platform H, such channels being preferably covered by a glass plate, G, held in place by a catch, $e$, capable of being swung aside to permit the said plate to be removed whenever desired. L is a lever, which is pivoted to a post, P, on the base-plate A; and said lever lies between a shoulder, $o$, and a pin, $i$, on the under side of the feed-board, so that when operated it will move the feed-board back and forth longitudinally. A series of grooves, $f\ f$, corresponding in number and position with the channels $a\ a$, are made in the platform H, which grooves increase in depth toward their lower ends, and terminate in notches or slots $g\ g$. I is a gate arranged to slide up and down in ways $s\ s$, provided in a frame, J, erected on the lower end of the feed-board. This plate I is provided with a number of teeth, $l\ l$, so arranged that they will bear upon and force the links or beads, one row at a time, into the passages or slots $p\ p$, so that they will rest upon the oscillating table K in the trough of the same. A pin, $m$, on this gate I enters a slot, $n$, in the frame J, and limits the upward and downward movement of the gate. M is a bar having an inclined upper surface, and attached to a cross-head, N, upon standards N' N', rising from the base-plate. A pin or projection, $j$, on the gate I travels along this incline as the feed-board moves back, and raises the gate. A pin, $q$, on the said cross-head N, actuated by a spring, $r$, bears on an incline, $t$, provided on the top of the gate I, and causes the gate to descend as the feed-board moves forward. The oscillating table K is pivoted, near its lower end, to the base B, and said table is provided with a longitudinal trough, $v$, of suitable width, to contain the completed chain. It is preferable to provide such trough, for a short distance from the front end, with overhanging sides, which will keep the chain down on the table. In the rear end of the raised sides of the table there are recesses or notches, which form an eye, $h$, through which may be threaded the wire that unites the links or beads of the chain. An oblique recess or groove, $w$, is made in the under side of the table, for receiving a pin, $b$, provided on a bolt, R, which bolt fits in the said part B of the base-plate, and is capable of being moved longitudinally back and forth by means of a knob or hand-piece, $d$, so that the pin $b$ will work in the recess $w$, and move the upper end of the table laterally back and forth.

The links or beads to be made into a chain are placed in the hopper C, and gradually find their way into the channels $a\ a$ in the feed-board G, and slide or move down to the gate I, and, as the feed-board moves back and the gate rises, one row of beads or links drop through the passages or slots $p\ p$ upon the platform H, and in the meantime the table K is shifted laterally, and the chain already made is pushed forward, and as the feed-board moves forward again, the gate descends and pushes these links along the grooves $f\ f$ unto the notches $g\ g$, whereby their outer portions are presented between the row of links or beads last fastened to the chain. A wire is now threaded through the eye $h$ of the table K, and is thus made to pass through the interposed adjacent ends of the two rows of links or beads and fasten them together. The feed-board E is now moved back again, and the gate I rises, as before, to allow another row of links or beads to pass to the platform H; the table K is shifted, the chain is fed forward, and the feed-board is moved forward, pushing the row of links, as before, along the grooves $f\ f$ unto the notches $g\ g$, and presenting them between the last row of links added to the chain. By feeding the chain onward the wire is securely bent over the edges of the links last united, and it is now threaded back through the eye $h$, and thereby secures the last row of links to the chain, and so the operation continues.

It will be seen that this machine is simple and reliable, having no parts liable to get out of order, and that it does not require to be operated by skilled workmen.

What I claim as my invention, and desire to secure by Letters Patent, is—

1. The combination of the reciprocating feed-board E, provided with guideways $a\ a$, the vertically-moving gate I, and the oscillating table K, substantially as and for the purpose herein specified.

2. The combination of the pin or projections $j$ and the gate I with the reciprocating feed-board E and bar or rail M, having an inclined face, substantially as and for the purpose herein specified.

3. The combination, with the reciprocating feed-board E, of the incline $t$ and the gate I, and the pin $q$, actuated by the spring $r$, substantially as herein specified.

4. The combination, with the platform H, provided with the notches $g\ g$, of the laterally-oscillating table K, substantially as and for the purpose herein specified.

WILLIAM F. DAVIS.

Witnesses:
 WM. TRESCOTT,
 JOHN B. MAINTIEN.